No. 826,230. PATENTED JULY 17, 1906.
J. A. COUTTS.
HARROW.
APPLICATION FILED AUG. 17, 1905.

2 SHEETS—SHEET 1.

Witnesses
J. C. Simpson
E. M. Calford

Inventor
James A. Coutts
By Chandlee & Chandlee
Attorney

No. 826,230. PATENTED JULY 17, 1906.
J. A. COUTTS.
HARROW.
APPLICATION FILED AUG. 17, 1905.

2 SHEETS—SHEET 2.

Witnesses
J. C. Simpson
E. M. Colfard

Inventor
James A. Coutts.
By Chandler Chandler
Attorneys

UNITED STATES PATENT OFFICE.

JAMES A. COUTTS, OF COLTON, SOUTH DAKOTA.

HARROW.

No. 826,230.  Specification of Letters Patent.  Patented July 17, 1906.

Application filed August 17, 1905. Serial No. 274,556.

*To all whom it may concern:*

Be it known that I, JAMES A. COUTTS, a citizen of the United States, residing in Colton, in the county of Minnehaha, State of South Dakota, have invented certain new and useful Improvements in Harrows; and I do hereby declare the following to be a full, clear, and exact description of the invention, such as will enable others skilled in the art to which it appertains to make and use the same.

This invention relates to harrows, and more particularly to attachments therefor, and has for its object to provide an attachment which will be arranged for operation to raise the harrow from the ground, thus bringing it into position to avoid obstacles in its path.

Another object is to provide an attachment of this kind which will be simple and which may be easily operated.

Other objects and advantages will be apparent from the following specification, which describes an embodiment of the present invention.

Figure 1:
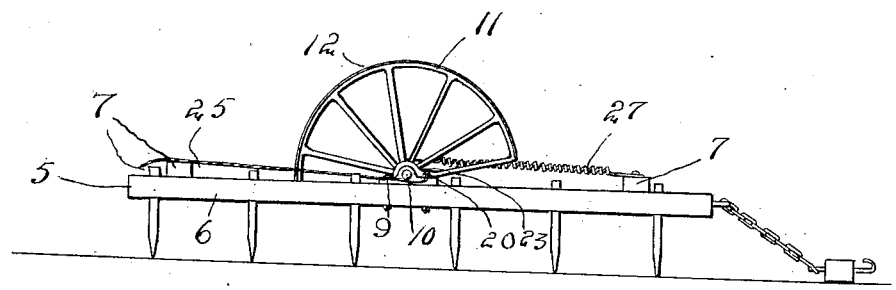
Figure 2:
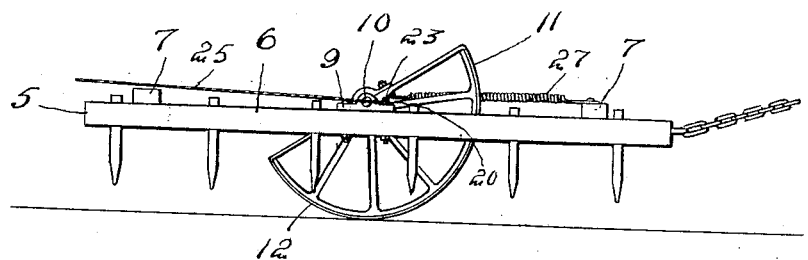
Figure 7:
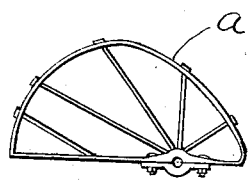
Figure 3:
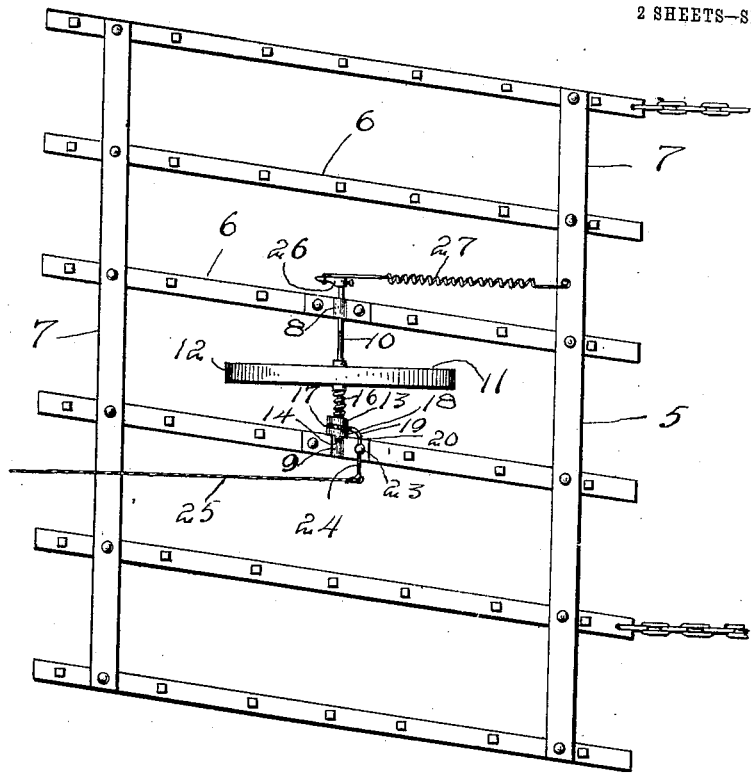
Figure 4:
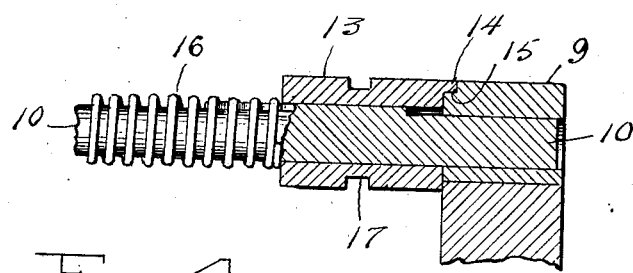
Figure 5:
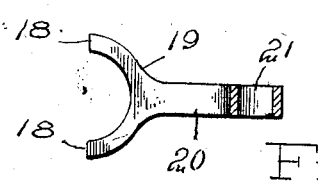
Figure 6:
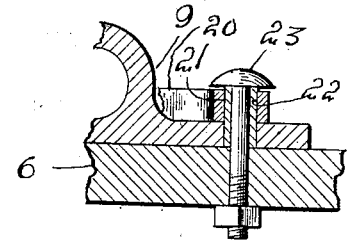

In the drawings forming a portion of this specification, and in which like characters of reference indicate similar parts in the several views, Figure 1 is a side elevation of a harrow provided with the present invention, the latter being in inoperative position. Fig. 2 is a view similar to Fig. 1, showing the half-wheel in engagement with the ground. Fig. 3 is a top plan view with the parts in position shown in Fig. 1. Fig. 4 is a detail sectional view of a portion of the shaft, clutch-sleeve, and one of the pillow-blocks. Fig. 5 is a detail view of the yoke, partly in section. Fig. 6 is a detail sectional view showing the mounting of the yoke. Fig. 7 is a view of a modified form of half-wheel.

Referring now to the drawings, there is shown a harrow 5, including longitudinal tooth-beams 6 and cross-beams 7. Two of the beams 6 are located at opposite sides of the center of the harrow, and to these beams at their centers there are attached a pair of pillow-blocks 8 and 9, respectively, which receive a transverse shaft 10 revolubly therewithin. Mounted upon this shaft for rotation therewith there is a half-wheel 11, this wheel being movable to bring its tread 12 into and out of engagement with the ground, and, as shown, when in engagement with the ground it holds the harrow in spaced relation thereto. A clutch-sleeve 13 is splined upon the shaft 10 adjacent to the pillow-block 9 and has an outwardly-extending finger 14 upon one end, which is arranged for engagement in a recess 15, formed in the inner surface of the pillow-block, and when thus engaged holds the shaft with the half-wheel above the harrow and in inoperative position. A spring 16 is disposed upon the shaft between the sleeve 13 and the half-wheel and holds the sleeve yieldably with its finger in the recess 15. The sleeve has a circumscribing groove 17, in which are engaged the fingers 18 of the yoke 19, this yoke having a stem 20, provided with a vertical opening 21, in which is loosely engaged a bushing 22, the latter having one of the attaching-bolts 23 of the boxing 9 passed therethrough, and it will thus be apparent that this bolt may be tightened without affecting the operation of the yoke. A laterally-extending lever 24 is carried by the yoke and has a cable 25 attached thereto, by means of which the yoke may be moved to bring the finger 14 of the sleeve out of the recess 15.

A crank-arm 26 is adjustably mounted upon the shaft outwardly of the pillow-block 8, and connected at one end with this crank-arm and at its other end with the forward cross-beam 7 there is a helical spring 27. The crank-arm when the half-wheel is in inoperative position extends upwardly and rearwardly, so that when the clutch-sleeve is moved into position to permit of free rotation of the shaft 10 the spring 27 revolves the half-wheel forwardly to bring its forward portion into engagement with the ground, when the forward motion of the harrow will cause the half-wheel to revolve to raise the harrow bodily at its forward portion and the rotation of the half-wheel will continue until its rearward portion has passed out of engagement with the ground, when the spring 27 having been again placed under tension it will move the half-wheel into its normal position.

It will be seen that the half-wheel forms, in effect, a cam for raising the harrow.

In Fig. 6 there is shown a modified form of the invention in which a skeleton cam *a* is provided in place of the half-wheel in the first-described form.

The pillow-block 8 may also be provided with a finger-receiving recess, so that the clutch-sleeve may be shifted from side to side of the half-wheel.

What is claimed is—

1. An attachment for harrows comprising attaching bearing-blocks, a shaft journaled in the bearing-blocks, a clutch-sleeve slidably mounted upon this shaft and arranged for rotation therewith, said clutch-sleeve and one of the bearing-blocks being arranged for coöperation to hold the shaft against rotation, said sleeve being movable into and out of coöperative relation to the bearing-block, means for holding the sleeve yieldably in operative position, means for moving the sleeve against the action of said holding means, a half-wheel mounted upon the shaft for rotation therewith, a crank-arm adjustably mounted upon the shaft, and a spring secured at one end to the crank-arm and adapted for attachment at its other end to a harrow.

2. An attachment for harrows comprising pillow-blocks, a shaft journaled in the pillow-blocks, means movable into and out of operative position for holding the shaft against rotation, a cam upon the shaft, and a spring connected with the shaft for rotation thereof.

In testimony whereof I affix my signature in presence of two witnesses.

JAMES A. COUTTS.

Witnesses:
P. W. DOUGHERTY,
J. A. PENROSE.